No. 708,902. Patented Sept. 9, 1902.
R. B. MUSGRAVE.
PAD FOR TREATING SHOE BOILS ON HORSES.
(Application filed Feb. 11, 1902.)
(No Model.) 2 Sheets—Sheet 1.
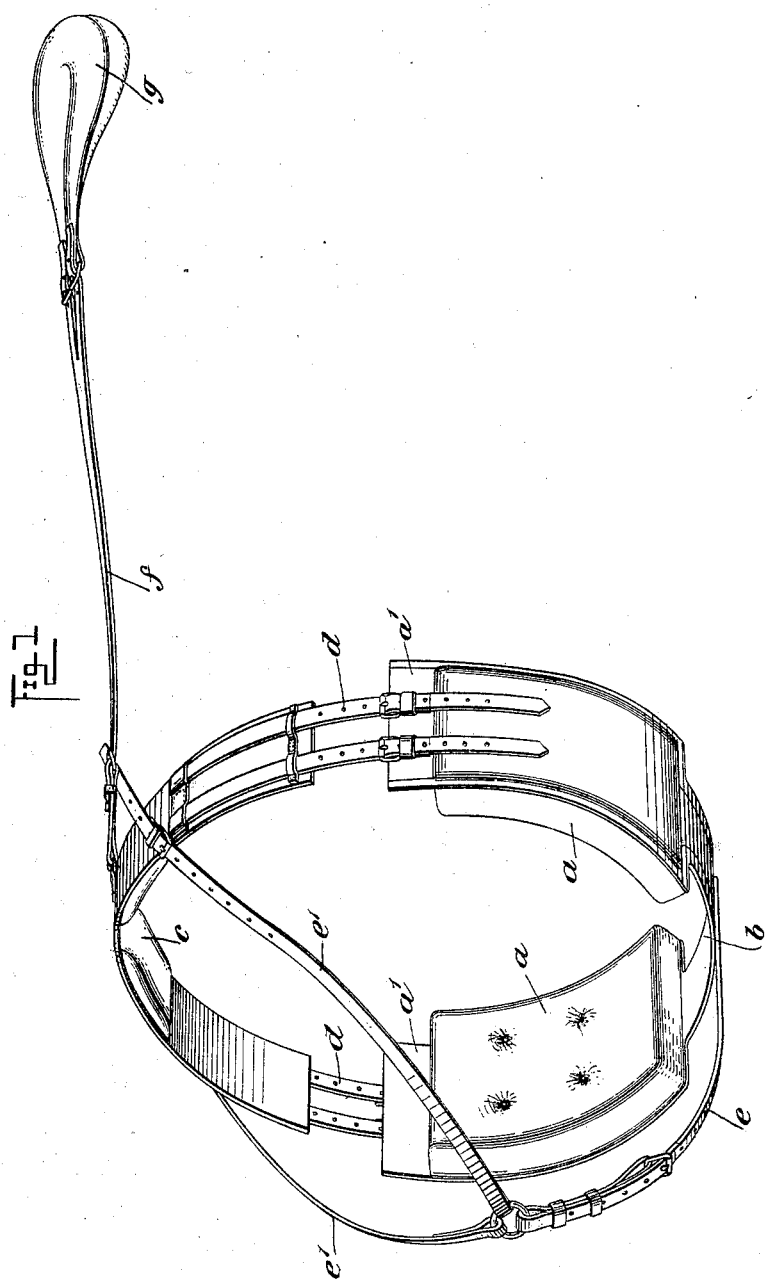
WITNESSES:
INVENTOR
Robert B. Musgrave
BY
ATTORNEYS No. 708,902. Patented Sept. 9, 1902.
R. B. MUSGRAVE.
PAD FOR TREATING SHOE BOILS ON HORSES.
(Application filed Feb. 11, 1902.)
(No Model.) 2 Sheets—Sheet 2.
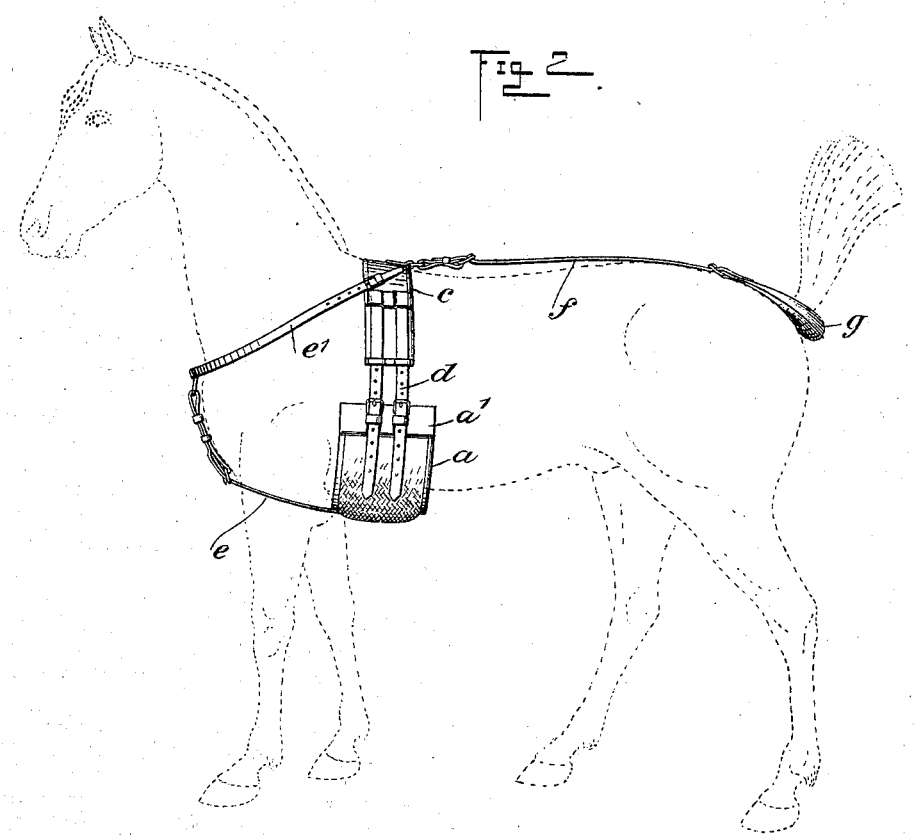
WITNESSES:
INVENTOR
Robert B. Musgrave
BY
ATTORNEYS

UNITED STATES PATENT OFFICE.

ROBERT B. MUSGRAVE, OF NEW YORK, N. Y.

PAD FOR TREATING SHOE-BOILS ON HORSES.

SPECIFICATION forming part of Letters Patent No. 708,902, dated September 9, 1902.

Application filed February 11, 1902. Serial No. 93,499. (No model.)

*To all whom it may concern:*

Be it known that I, ROBERT B. MUSGRAVE, a citizen of the United States, and a resident of the city of New York, borough of Manhattan, in the county and State of New York, have invented new and useful Improvements in Pads for Treating Shoe-Boils on Horses, of which the following is a full, clear, and exact description.

This invention relates particularly to a means for protecting and compressing shoe-boils which frequently occur on the fore legs of horses immediately below the shoulders, so that upon the application of proper remedies the boil may be reduced and finally removed.

The invention comprises, generally stated, a pad or pads formed comparatively thick, so that when placed against the side of the horse's body, immediately behind the fore leg, their front portions will lie directly against the shoe-boil. This provides a protector for the shoe-boil when the horse lies down, the pad taking the weight of the horse and preventing pressure from being applied to the boil and also preventing contact of the hoof and shoe with the boil.

The invention further includes a novel form of crupper adapted to assist in nicking a horse.

This specification is an exact description of one example of my invention, while the claims define the actual scope thereof.

Reference is to be had to the accompanying drawings, forming a part of this specification, in which similar characters of reference indicate corresponding parts in both the figures.

Figure 1 is a perspective view of the invention, and Fig. 2 is a view showing the device applied to a horse.

Referring particularly to Fig. 1, $a$ indicates the pads, which are preferably two in number and which may be constructed in any manner desired, so that while being sufficiently soft to prevent hurting the horse they are yet so rigid as to prevent their collapsing under pressure. They are preferably formed of curled hair with a canvas cover. These pads are each provided with an upward extension $a'$ of the pad-covering and may be of leather, canvas, or other suitable material. The extensions $a'$ project from the outer sides of the pads. The pads are connected at the bottom by a belly-band $b$, which is also formed by extending the pad-coverings at the outer sides of the pads.

$c$ indicates a saddle or saddle-like member which is adapted to lie on the back of the horse and supports the pads $a$ through the medium of skirt-straps $d$, which are attached to the saddle and extend down to the extensions $a'$ of the pad-coverings, whereto the straps are joined by buckles or other suitable fastening devices. The pads thus arranged are placed on the horse in the manner shown in Fig. 2—that is to say, the pads lie against the sides of the horse's body immediately behind the fore legs, the pads passing well under the body of the horse and assuming the curved form shown in Fig. 1. The band $b$ extends under the body of the horse to connect the pads together and the saddle $c$ rests on the horse's back. The straps $d$ may be adjusted so as to hold the pads firmly in place. For holding the pads properly in position against the boils a breast-strap $e$ is provided, the breast-strap being adapted to pass between the fore legs of the horse and up over its breast.

$e'$ indicates branches of the strap $e$, said branches passing on each side of the neck over the shoulders of the horse and being connected to the saddle-piece by buckles or other devices which will facilitate the adjustment of the straps. By tightening these straps the pads may be drawn up tightly against the boils on the legs of the horse. (See dotted lines in Fig. 2.) Connected to the top of the saddle-piece is a crupper-strap $f$, and $g$ indicates the crupper, which in passing under the tail of the horse prevents the appliance from working forward. The crupper $g$ is of exaggerated thickness, as the drawings show, and is intended not only to perform the functions explained above, but also to enforce the horse to keep his tail raised in the air, as indicated in Fig. 2. Now it will be observed that these pads, constructed and arranged as explained, will fully protect the shoe-boil. Also by means of the straps $e\ e'$ the pads may be forced forward against the boil, thus applying pressure to it and reducing and eventually wholly removing it. The pad may be used to hold wadding and other bandages against the boil to apply medicine thereto. Also as the horse lies down its weight is rested on the pads and transmitted thereby to the body of the horse, so that the injured part in no way is affected, nor can the horse strike the boil with his hoof, as would be the case if the pad were not employed.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A device for treating shoe-boils on horses, said device comprising two pads adapted to lie against the sides of the body of the horse immediately behind the fore legs, a connection between the pads, the connection passing under the body of the horse, a saddle adapted to lie on the back of the horse, connections between the sides of the saddle and the pads, a breast-strap attached to the connection between the pads under the horse and extending forward, said breast-strap having branches passed over the shoulders of the horse and connected to the saddle, and a device connected to the saddle and extending backward to the tail of the animal to prevent the saddle working forward.

2. A device for treating shoe-boils on horses, said device comprising two pads adapted to lie against the sides of the body of the horse immediately behind the fore legs, and means for holding said pads in position, said means comprising a connection between the pads, the connection passing under the horse, a saddle-like member lying on the back of the horse and connected with the pads, and fastenings extending forward and rearward from said parts to prevent forward and rearward displacement thereof.

3. A device for treating shoe-boils on horses, said device comprising two pads adapted to lie against the sides of the body of the horse immediately behind the fore legs, a connection between the pads, said connection passing under the body of the horse, a saddle-like member lying on the back of the horse and connected with the pads to support them, and means attached to said connection between the pads and extending forwardly over the shoulders of the horse, to prevent the rearward displacement of said parts.

4. A device for treating shoe-boils on horses, said device comprising two pads adapted respectively to lie at the sides of the body of the horse immediately rearward of the fore legs, and said pads having extended coverings projected from the ends thereof, a saddle-like member having connection with the covering extensions at the upper ends of the pads to sustain the pads, and a connection between the cover extensions at the lower ends of the pads, said connection passing under the body of the horse.

In testimony whereof I have signed my name to this specification in the presence of two subscribing witnesses.

ROBERT B. MUSGRAVE.

Witnesses:
J. L. McAULIFFE,
EVERARD B. MARSHALL.